US012270536B2

(12) United States Patent
Van Bokhoven

(10) Patent No.: US 12,270,536 B2
(45) Date of Patent: Apr. 8, 2025

(54) LIGHT FITTING

(71) Applicant: WIETSE BEHEER B.V., Helmond (NL)

(72) Inventor: Wietse Van Bokhoven, Helmond (NL)

(73) Assignee: WIETSE BEHEER B.V., Helmond (NL)

( * ) Notice: Subject to any disclaimer, the term of this patent is extended or adjusted under 35 U.S.C. 154(b) by 0 days.

(21) Appl. No.: 18/564,917

(22) PCT Filed: May 30, 2022

(86) PCT No.: PCT/IB2022/055063
§ 371 (c)(1),
(2) Date: Nov. 28, 2023

(87) PCT Pub. No.: WO2022/249155
PCT Pub. Date: Dec. 1, 2022

(65) Prior Publication Data

US 2024/0240781 A1 Jul. 18, 2024

(30) Foreign Application Priority Data

May 28, 2021 (NL) ...................................... 2028335

(51) Int. Cl.
*F21V 29/58* (2015.01)
*F21V 15/01* (2006.01)
(Continued)

(52) U.S. Cl.
CPC ............ *F21V 29/58* (2015.01); *F21V 15/013* (2013.01); *F21V 17/164* (2013.01); *F21Y 2115/10* (2016.08)

(58) Field of Classification Search
CPC .... F21V 15/013; F21V 17/164; F21V 23/006; F21V 29/58; F21V 29/59; F21V 29/60;
(Continued)

(56) References Cited

U.S. PATENT DOCUMENTS

| | | | | |
|---|---|---|---|---|
| 5,321,595 A * | 6/1994 | Jacobi | F21V 29/56 | 362/345 |
| 2006/0193125 A1* | 8/2006 | Fluss | H05B 47/18 | 362/231 |

(Continued)

FOREIGN PATENT DOCUMENTS

| | | | |
|---|---|---|---|
| DE | 202014105523 U1 | | 2/2016 |
| WO | 2016115314 A1 | | 7/2016 |
| WO | 2019204805 A1 | | 10/2019 |

OTHER PUBLICATIONS

Patent Cooperation Treaty, International Search Report, Application No. PCT/IB2022/055063, dated Nov. 14, 2022, in 3 pages.

*Primary Examiner* — Omar Rojas Cadima

(74) *Attorney, Agent, or Firm* — Procopio, Cory, Hargreaves & Savitch LLP

(57) ABSTRACT

A light fitting comprises a housing (10) with at least a connection (14) for a light source (30) and with an electronic control circuit (13) which is able and configured to control and to power the light source (30). The control circuit (13) adopts during operation a reference potential from a reference point, particularly earth. The housing is connected for heat-exchanging contact to a cooling device (20) which comprises at least one channel (21, 22) for carrying a heat-carrying medium. The heat-carrying medium comprises here an electrically conductive cooling liquid and is electrically coupled to the reference point during operation.

11 Claims, 1 Drawing Sheet

(51) Int. Cl.
*F21V 17/16* (2006.01)
*F21Y 115/10* (2016.01)

(58) Field of Classification Search
CPC ...... F21V 29/61; F21V 29/63; F21Y 2115/10; H01L 33/648; F21S 45/48
See application file for complete search history.

(56) References Cited

U.S. PATENT DOCUMENTS

2010/0265717 A1* 10/2010 Luettgens ............. F21V 29/767
362/294
2011/0267805 A1 11/2011 Hua et al.

* cited by examiner

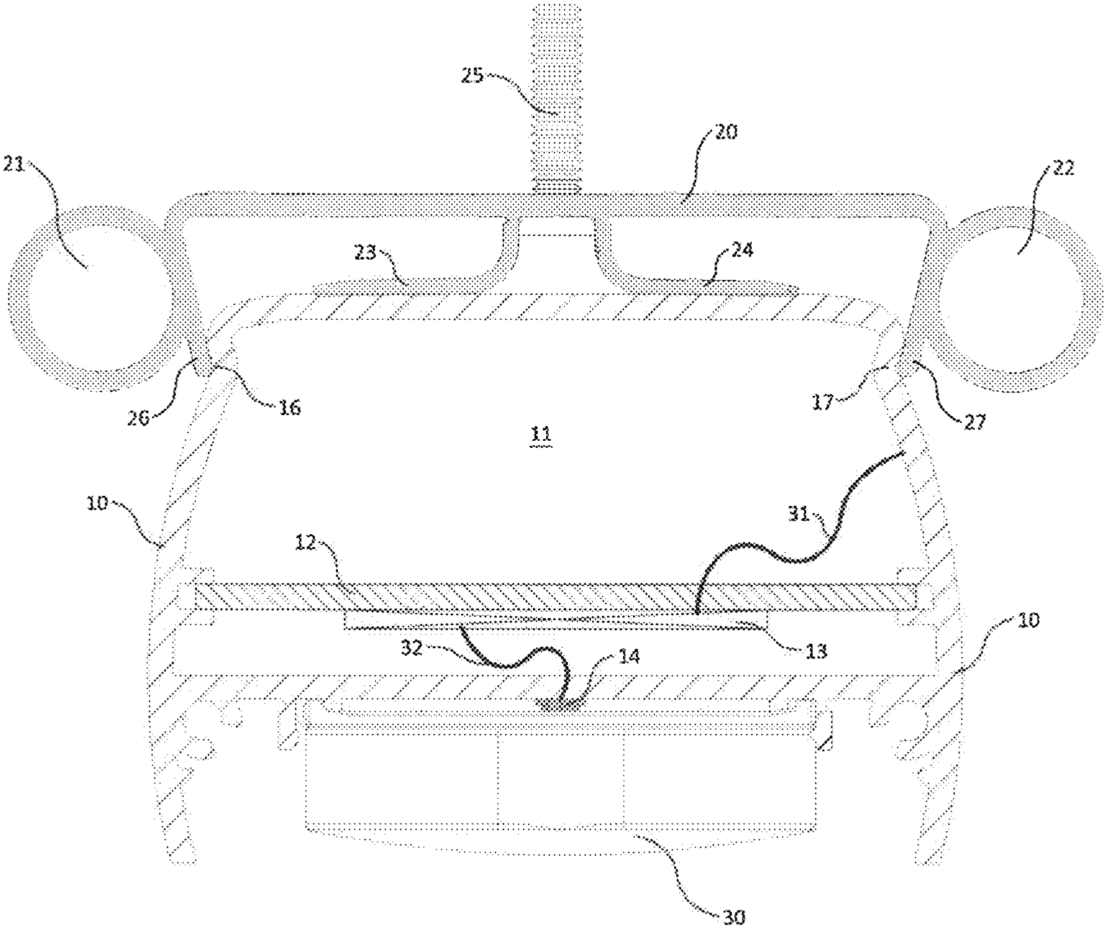
25
20
21
22
23
24
26
16
17
27
11
10
31
12
10
13
32
14
30

LIGHT FITTING

CROSS-REFERENCE TO RELATED APPLICATIONS

This application is US National Stage of International Patent Application PCT/IB2022/055063, filed May 30, 2022, which claims benefit of priority from Dutch Patent Application NL2028335, filed May 28, 2021, the contents of both of which are incorporated herein by reference.

The present invention relates to a light fitting, comprising a housing with at least a connection for a light source and with an electronic control circuit which is able and configured to control and to power the light source, wherein the control circuit adopts at least during operation a reference potential from a reference point, particularly earth, and wherein the housing is connected for heat-exchanging contact to a cooling device which comprises at least one channel for carrying a heat-carrying medium.

Such light fittings are applied on large scale in the horticultural sector and to illuminate buildings. In horticulture it is a recent trend to cultivate without entry of daylight, for instance underground or in other manner in a closed, daylight-free space. The photo-active radiation (PAR) needed for the photosynthesis in green plants and crops is in that case provided wholly by means of artificial light, while a spatial climate in the cultivation environment is otherwise usually also wholly controlled and monitored. Besides the air humidity and ambient temperature, the spectrum and the light intensity of the supplied artificial light can also be accurately controlled and adapted to the requirements of the crop. In addition to usable light, current light fittings inevitably also produce an amount of heat. This is still the case even in modern and relatively energy-efficient light sources such as LEDs. In order to be able to discharge the excess heat generated by the light sources and the electronics coupled thereto a cooling is provided in the form of the cooling device through which is carried a cooling liquid which enters into heat-exchanging contact with the fitting.

Artificial light often involves a large number of light fittings which are controlled centrally and thereby generate the desired spectrum and/or the correct intensity. A number of protocols has been developed for this purpose in the field of lighting technology, one of which is the DALI (Digital Addressable Lighting Interface) protocol. The DALI interface is a globally standardized protocol for controlling control circuits which provide for power supply and control of light fittings via a separate bus connection. The number of producers and suppliers of light fittings and related control solutions participating in the DALI protocol is over a hundred and includes almost all large electrical engineering companies. The DALI standard is therefore an open standard to which a manufacturer can commit voluntarily.

Prominent in the field of climate control in (glass) horticulture in particular is the so-called Modbus. Modbus is a data communication protocol which was originally introduced for use with programmable logic controllers (PLCs). Eventually, Modbus grew to be a de facto standard communication protocol, and it is widely applied as bus control in various industrial electronic devices. It is particularly in glass horticulture and nowadays also in cultivation without daylight (indoor farming) that the Modbus is very popular as communications and control platform between a central climate computer and climate sensors and actors distributed in a cultivation environment.

Conformity to the standard is a prerequisite to be able to guarantee the interoperability between fittings, equipment and controls of various origins. It has however been found in practice that the implementation also has a significant influence on a correct operation of such a bus control. It is found particularly if a (large) number of light fittings is controlled from a collective bus at a location that not all fittings operate in the desired manner.

The present invention has for its object, among others, to provide a light fitting which is centrally controllable and can here be implemented with greater operational reliability.

In order to achieve the stated object a light fitting of the type described in the preamble has the feature according to the invention that the heat-carrying medium comprises an electrically conductive cooling liquid and that the electrically conductive cooling liquid is electrically coupled to the reference point during operation. The invention is here based on the insight that a correct control of a light fitting, particularly by means of a digital or analog bus shared by a (large) number of further light fittings, is entirely dependent on a reliable and equal reference potential. This reference potential is adopted by the control circuit from a reference point provided for this purpose; usually a contact connected to earth or a zero level.

By making use of an electrically conductive cooling liquid in one or more cooling bodies whereby the light fittings are cooled and by electrically connecting the individual reference points thereto an equipotential surface is created, or at least advanced, between the individual reference points, whereby the individual control circuits receive an equal reference potential as far as possible. The control by means of a digital bus, such as a DALI bus, has been found to thereby take place in significantly more accurate and reliable manner, even when a considerable number of light fittings are sharing this same cooling liquid.

For the purpose of a reliable electrical connection between the reference point and the electrically conductive cooling liquid a preferred embodiment of the light fitting has the feature according to the invention that the at least one channel is bounded by an electrically conductive channel wall which enters into contact with the electrically conductive cooling liquid during operation, and that the channel wall is electrically coupled to the reference point, and more particularly that the cooling device comprises a monolithic cooling body in which the at least one channel extends, particularly an extrusion body, more particularly an extruded metal body, preferably of aluminium. The contact can here take place directly between the material of the channel wall and the conductive liquid, but for connection of subsequent conduit parts metal appendages are preferably also applied, such as taps, filters, (rapid) couplings and sockets which enter into contact with the liquid and thereby likewise contribute to the stated equipotential level over the installation. These also break through an insulating skin which may be present on the conduit system, so that the potential is nevertheless coupled thereto. There is therefore preferably a galvanic contact with the liquid over at least substantially the whole length of the contact surface of the electrically conductive channel wall.

This same channel wall can in turn be connected in electrically conductive manner to the reference point for the control circuit. For this purpose a further particular embodiment of the light fitting has the feature according to the invention that the housing is formed by a metal profile, particularly an extruded metal profile, preferably of aluminium. By thus making use of a metal housing for the fitting and bringing it into metallic contact with the cooling device all metal parts will share the same (reference) potential, such as earth, with each other. The cooling device or the housing itself thus particularly forms the potential surface for the control circuit, which is for instance coupled to earth or a zero level.

In order to be able to place or replace a light fitting in simple manner without interrupting the cooling liquid a further preferred embodiment of the light fitting has the feature according to the invention that at least the connection for the light source and the electronic control circuit are accommodated in a housing which is coupled releasably to the cooling device and is in heat-exchanging contact therewith.

A particular embodiment of the light fitting has the feature here that the housing of the fitting maintains a snap connection with the cooling device. The number of light fittings can thus be expanded in simple manner by coupling more fittings to a collective cooling body, and a fitting can also be exchanged and replaced in simple manner if it is found to be malfunctioning. In the case of a snap connection the relevant fitting is simply released from or snapped into the cooling device.

In order to remove any clearance between the housing of the fitting and the cooling device, which could otherwise impede an adequate heat transfer, a particular embodiment of the light fitting has the feature according to the invention that the housing is connected to the cooling device via a compressible heat-conducting contact body. The contact body is here dimensioned such that when the fitting is placed it will be compressed slightly and thereby lies against the fitting and the cooling device under tension. This ensures an adequate heat-exchanging contact between the fitting and the cooling device.

In a first further particular embodiment the light fitting has the feature according to the invention that the cooling device and the electrically conductive cooling liquid are shared with at least one similar further light fitting. In that case a number of light fittings is coupled to a collective cooling body and thereby to a collective equipotential surface provided by the cooling device and cooling liquid flowing therethrough.

In a second further particular embodiment the light fitting has the feature according to the invention that the electrically conductive cooling liquid is shared with at least one similar further light fitting which is coupled to a separate cooling body. In this case a number of light fittings is distributed over separate cooling bodies, but the electrically conductive cooling liquid shared thereby provides an equipotential surface between the different cooling bodies so that the control circuits will nevertheless receive an equal reference potential.

Various liquids are per se suitable as cooling liquid, wherein a selection according to the invention will not be determined solely by the heat-carrying capacity (i.e. the heat capacity) thereof, but also by the electrical conductivity. Candidates suitable in that respect are for instance various saline solutions, wherein use is preferably made as the electrically conductive cooling liquid of a saline solution which provides a large number of free electrons, for instance in the form of many free ions and/or polyvalent ions.

Although for the light source any desired light source can in principle also be applied, the light fitting particularly has the feature according to the invention that the light source comprises at least one light-emitting diode (LED), particularly a system of optionally identical light-emitting diodes (LEDs). By making use here of a system of optionally identical diodes which are individually controllable, optionally in groups, both an intensity and light colour of the supplied artificial light can be precisely adapted to an actual requirement, such as an optimal spectrum of photo-active radiation (PAR) supplied to a crop to be cultivated. For control thereof use is advantageously made of an existing bus standard and/or protocol as in a further particular embodiment of the fitting according to the invention, which is characterized in that the electronic control circuit comprises a bus interface for digital data exchange with a digital control bus, particularly on the basis of the DALI-protocol (Digital Addressable Lighting Interface), the DMX (digital multiplexing) 512 protocol or the Modbus protocol.

The invention will be further elucidated hereinbelow with reference to an exemplary embodiment and an accompanying drawing. In the drawing:

FIG. 1 shows a cross-section of an exemplary embodiment of a light fitting according to the invention.

It is otherwise noted here that the figure is purely schematic and not always drawn to (the same) scale. Some dimensions in particular may be exaggerated to greater or lesser extent for the sake of clarity. Corresponding parts are designated in the figure with the same reference numeral.

The light fitting of FIG. 1 comprises a housing 10 which is formed wholly from aluminium as elongate hollow extrusion profile. A cavity inside the extrusion profile provides a continuous chamber 11 in which is accommodated a printed circuit board (PCB) 12 with a control circuit 13 thereon. The control circuit 13 can otherwise also be arranged wholly or partially externally, for instance above or under the chamber 11. The control circuit 13 comprises a bus interface with connection (not drawn) for a digital Modbus bus whereby circuit 13 can be controlled centrally. Housing 10 further comprises a connection (socket) 14 for a light source 30 which is coupled to circuit 13. In this embodiment the light source comprises one or more high-power LEDs with an exceptionally great light output in the spectrum relevant for crops in respect of photosynthesis. Circuit 13 is able to switch the light source(s) 30 to a desired value in respect of intensity and spectrum, driven for this purpose from the Modbus bus. Instead of a Modbus control, use can otherwise also be made for the lighting of a DALI or a DMX(512) bus with corresponding control and interfaces.

The housing is connected releasably to a cooling device 20. The cooling device 20 is likewise formed by an elongate aluminium extrusion profile in one whole. An inlet channel 21 and return channel 22 of a cooling system extend longitudinally in the cooling device and are coupled externally (not shown) to a heat exchanger and a pump. During operation a cooling liquid circulates through the channels 21, 22 and so keeps the material of cooling device 20 at a desired low temperature.

Provided between cooling device 20 and housing 10 of the fitting is a compressible contact element in the form of a number of resilient (leaf) fingers 23, 24 which lie clampingly against housing 10 of the fitting. This contact element provides for a good thermal contact between the cooling device 20 on one side and the housing 10 of the fitting on the other. Housing 10 is in turn coupled thermally to the circuit 13 and the light source 30 so that heat dissipated therein will be discharged via the material of aluminium housing 10 and the material of cooling device 20, and absorbed and carried away by the cooling liquid in channels 21, 22.

For a simple mounting and possible replacement of the fitting the housing 10 is coupled releasably to the cooling device 20. Formed for this purpose on the cooling device is a set of resilient snap wings 26, 27 which fall within respective recesses 16, 17 extending as elongate grooves on a base of housing 10. Housing 10 is placed with a first of the two grooves 16, 17 against one of the two wings 26, 27 and then snapped with the other groove 17, 16 behind the other wing 27, 26 by means of a pivoting movement. The housing thus clamps itself fixedly between the two resilient wings and therewith compresses the contact element 23, 24 slightly, whereby a good thermal contact results at a number of positions. This thermal contact between the housing and the cooling device also serves as an electrical connection.

For a correct control of light source 30 the circuit 13 relies on a contact with a fixed reference potential, such as earth in this example. The circuit adopts this from housing 10, which is designated schematically in the figure by means of a wiring 31 but can in practice also be a point contact. The same is true for a wiring 32 to the socket 14 of light source 30, which can likewise be formed by a set of connectors. In order to avoid fluctuations of the reference potential between different fittings the earth contact 31 is according to the invention galvanically coupled to the circulating cooling liquid in channels 21, 22 which is shared by the fittings, and an electrically conductive liquid is applied as that liquid. This liquid thereby levels the potential between the different reference points and thereby creates as it were an equipotential surface which is shared as earth by the individual circuits 13 of the different fittings. Cooling device 20 is for this purpose provided at a suitable position of an earth connection 25, whereby the fitting can be connected to the electrical installation present in the building.

Use is in this embodiment made of a copper sulphate solution in water as the electrically conductive liquid, although other liquids with a sufficient conductivity and heat-carrying capacity can also be applied instead. Preferably used as electrically conductive cooling liquid, as it is in this embodiment, is a saline solution which provides a large number of free electrons in the form of many free ions and/or polyvalent ions.

Although the invention has been further elucidated above on the basis of only a single exemplary embodiment, it will be apparent that the invention is by no means limited thereto. On the contrary, many variations and embodiments are still possible within the scope of the invention for a person with ordinary skill in the art.

The invention claimed is:

1. A light fitting, comprising:

a housing with at least a connection for a light source; and an electronic control circuit which is able and configured to control and to power the light source, wherein the control circuit adopts during operation a reference potential relative to a reference point, wherein the housing is connected for heat-exchanging contact to a cooling device which comprises at least one channel for carrying a heat-carrying medium, characterized in that the heat-carrying medium comprises an electrically conductive cooling liquid and that the electrically conductive cooling liquid is electrically coupled to the reference point during operation, wherein at least the connection for the light source and the electronic control circuit are accommodated in the housing, and wherein the housing is coupled releasably to the cooling device and is in heat-exchanging contact therewith.

2. The light fitting according to claim 1, characterized in that the at least one channel is bounded by an electrically conductive channel wall which enters into contact with the electrically conductive cooling liquid during operation, and that the channel wall is electrically coupled to the reference point.

3. The light fitting according to claim 1, characterized in that the cooling device comprises a monolithic cooling body in which the at least one channel extends, the monolithic cooling body comprising an extrusion body, an extruded metal body, or aluminium.

4. The light fitting according to claim 1, characterized in that the housing is formed by a metal profile, an extruded metal profile, or aluminium.

5. The light fitting according to claim 1, characterized in that the electronic control circuit comprises a bus interface for digital data exchange with a digital control bus, on a basis of DALI-protocol (Digital Addressable Lighting Interface), DMX (digital multiplex) protocol, or Modbus protocol.

6. The light fitting according to claim 1, characterized in that the housing of the fitting maintains a snap connection with the cooling device.

7. The light fitting according to claim 6, characterized in that the housing is connected to the cooling device via a compressible heat-conducting contact body.

8. The light fitting according to claim 1, characterized in that the cooling device and the electrically conductive cooling liquid are shared with at least one similar further light fitting.

9. The light fitting according to claim 1, characterized in that the electrically conductive cooling liquid is shared with at least one similar further light fitting which is coupled to a separate cooling body.

10. The light fitting according claim 1, characterized in that electrically conductive cooling liquid is used.

11. The light fitting according to claim 1, characterized in that the light source comprises at least one light-emitting diode (LED), particularly a system of optionally identical light-emitting diodes (LEDs).

* * * * *